United States Patent [19]
Ide

[11] Patent Number: 5,213,545
[45] Date of Patent: May 25, 1993

[54] COUPLING FOR USE IN A CONSTANT VELOCITY SHAFT

[76] Inventor: Russell D. Ide, P.O. Box 744, 641 Arnold Rd., Coventry, R.I. 02816

[21] Appl. No.: 678,157

[22] Filed: Apr. 1, 1991

[51] Int. Cl.$^5$ ............................................. F16D 3/202
[52] U.S. Cl. ..................... 464/111; 464/123; 464/132; 464/905
[58] Field of Search ............... 464/111, 120, 122, 123, 464/124, 132, 905

[56] References Cited

U.S. PATENT DOCUMENTS

| | | | |
|---|---|---|---|
| 4,192,154 | 3/1980 | Nakamura et al. | 464/111 |
| 4,379,706 | 4/1983 | Otsuka et al. | 464/132 X |
| 4,891,035 | 1/1990 | Sasaki et al. | 464/905 X |

FOREIGN PATENT DOCUMENTS 2226102A 6/1990 United Kingdom.
2237618A 5/1991 United Kingdom.

OTHER PUBLICATIONS

"Universal Joint and Driveshaft Design Manual: Advances in Engineering Series, No. 7"; The Society of Automotive Engineers, Inc., 1979.
Advertisement of General Motors' Saginaw Division describing S-plan joint. Published prior to Apr. 1, 1991.
Copy of Article from Neapco Inc., Pottstown, PA, 1986.
Copy of Article from publicated entitled "The Motor Vehicle" (Eleventh Edition) by K. Newton, et al., 1989.

*Primary Examiner*—Katherine Matecki
*Assistant Examiner*—William G. Battista, Jr.
*Attorney, Agent, or Firm*—Marks & Murase

[57] ABSTRACT

A coupling for coupling two shafts. The coupling is well suited for use as the inboard plunging coupling for a front wheel drive vehicle. The coupling includes a drive canister, a trunnion received within the drive canister and bearing assemblies which mount the trunnion for plunging and pivoting motion within the drive canister. The bearing assembly can include a series of radially spaced bearing surfaces so as to distribute load about a greater area thereby increasing the torque carrying capacity of the assembly.

19 Claims, 4 Drawing Sheets

COUPLING FOR USE IN A CONSTANT VELOCITY SHAFT

FIELD OF THE INVENTION

The present invention relates to a coupling for use in a constant velocity joint for connecting two shafts so that rotation of one shaft about its own axis results in rotation of the other shaft about its axis. The present invention is particularly directed to a coupling for use as the inboard plunging joint of a constant velocity joint used in a front wheel drive of a motor vehicle.

BACKGROUND OF THE INVENTION

Constant velocity joints connect shafts such that the speeds of the shafts connected by the joint are absolutely equal at every instant throughout each revolution. This distinguishes constant velocity joints from simple universal joints. Specifically, if one of the shafts connected by a universal joint is revolving at an absolutely constant speed, then the other shaft will revolve at a speed that is, during two parts of each revolution, slightly greater and, during the other two parts of the revolution, slightly less than the constant speed of the first shaft. The magnitude of this fluctuation in speed increases as the angle between the axes of the two shafts increases. This disadvantage becomes of practical importance in applications requiring constant velocity such as front wheel driven vehicles and in the drives to independently sprung wheels where the angles between the shafts may be as large as 40°.

It is known that the speed variation problem can be solved by using two universal joints in series. If the joints are properly arranged, the irregularity introduced by one joint will be cancelled out by the equal and opposite irregularity introduced by the second joint. Constant velocity joints include such double universal joints as well as any joint in which the speeds of the shafts connected by the joint are absolutely equal at every instant throughout each revolution. Typically a constant velocity joint includes a shaft with a universal-type coupling at each end. This arrangement is sometimes referred to as a constant velocity shaft.

In a front wheel drive vehicle, constant velocity drive shafts are always used in pairs. One shaft is located on the left (driver) side of the vehicle and the other is placed on the right (passenger) side. Each shaft has an inboard or plunge coupling that connects the constant velocity shaft to the engine/transaxle and an outboard or fixed coupling that connects the shaft to a left or right wheel. The inboard and outboard couplings and shaft together comprise a constant velocity joint or drive shaft which couples the engine/transaxle shaft to the wheel shaft. In operation, the outboard coupling turns with the wheel around a "fixed" center, while the inboard coupling "telescopes" or plunges and turns at an angle sufficient to allow required movement of the car's suspension system.

Each coupling must be capable of pivoting at least about two transverse axes to the extent required by the specific application. For example, a compact constant velocity joint that provides power to the wheels typically must operate at angles of 40° or more to meet the car's requirements for steering and suspension movements. Thus, each end of the joint must be able to move at least 20°.

Various constant velocity joints have been developed for use in motor vehicles. These include the Tracta joint manufactured in England by Bendix Limited, the so called Weiss joint manufactured in America by Bendix Products Corporation and a joint developed by Birfield Transmissions Limited. Today, there are two basic outboard joint designs and three basic inboard joint designs commonly in use.

The two basic outboard front wheel drive couplings are the Rzeppa and the fixed tripod design. The Rzeppa design includes a cage, inner and outer races and a matched set of six balls guided by the cage. The fixed tripod design includes a three legged cross or trunnion fixed in a housing, a shaft end having a tulip shape, and tracks of circular cross-section to match the rollers.

The three basic types of inboard front wheel drive couplings are the cross groove design, the double offset design and the tripod-plunge design. The cross groove design includes a cage, angled inner and outer races, and a matched set of six balls, guided by the cage for movement in the races. The double offset design is similar to the Rzeppa design and includes a cage, inner and outer races having grooves formed therein, and six balls guided by the cage. The tripod plunge design includes a three legged cross or trunnion and a bearing assembly fixed in place on a splined shaft. The assembly slides in a grooved tulip shaped housing.

One of the basic requirements of the inboard plunging joint or coupling is that it must be able to transmit torque into the wheel axle. The previously mentioned inboard plunging couplings have performed satisfactorily in small cars with relatively low torque engines. However, such couplings have not performed well when applied to larger cars with higher torque engines. Accordingly, there have been attempts to increase the torque carrying capacity of known inboard plunging joints.

One inboard plunging joint designed by General Motors to minimize ride disturbance induced by high angulation under high torque, known as "shudder", is shown in FIGS. 1 and 1A. This joint is called the S-plan joint and is said to provide shudderless operation.

As shown in FIG. 1, the S-plan joint is a modified version of the tripod plunge design inboard joint. The S-plan joint typically includes a drive canister or housing 10 having axial grooves formed therein, a trunnion 30 having a splined shaft receiving opening and three legs, a bearing assembly 60 supporting each leg in an axial groove and a flexible boot assembly including a boot 40, sealing ring 41 and clamp 42 for sealing the interior of the joint. Snap rings 6 are provided to retain an engine/transaxle shaft 1 in the splined opening of the trunnion 30. The principal difference between the S-plan joint and a conventional tripod plunge design CV joint is that the bearing assemblies 60 of the S-plan joint are square so that the torque transmitting surface area is increased significantly. The increased torque carrying capacity of this joint eliminates angulation under high torque (shudder).

The principal disadvantage of the S-plan joint is that the square bearing assemblies 60 responsible for the improved torque capacity results are very intricate and expensive. As best shown in FIG. 1A, each square bearing assembly 60 includes an outer housing 62, outer races 61 and inner races 64 and a series of tiny needle bearings 63 between the outer race 61 and inner race 64. This complex multi-part structure is quite expensive both in terms of cost of the parts and assembly time.

This expense is significant since each vehicle requires six such bearing assemblies.

Thus, there is a need for an inexpensive, easily assembled inboard plunging coupling capable of transmitting high torque.

The present invention also relates to the use of bearing sleeves instead of rolling element bearings.

This application relates, in part, to the use of sleeve bearings which can be used instead of expensive ball bearings. The principal limitation in a sleeve bearing's performance is the so-called PV limit. For instance, high edge loading causes a sleeve bearing to reach its PV limit. PV is the product of load or pressure (P) and sliding velocity (V). A sleeve bearing subjected to increasing PV loading will eventually reach a point of failure known as the PV limit. The failure point is usually manifested by an abrupt increase in the wear rate of the bearing material.

As long as the mechanical strength of the bearing material is not exceeded, the temperature of the bearing surface is generally the most important factor in determining PV limit. Therefore, anything that affects surface temperature—coefficient of friction, thermal conductivity, lubrication, ambient temperature, running clearance, hardness and surface finish of mating materials—will also affect the PV limit of the bearing.

Thus, the first step in selecting and evaluating a sleeve bearing is determining the PV limit required by the intended application. It is usually prudent to allow a generous safety margin in determining PV limits, because real operating conditions often are more rigorous than experimental conditions.

Determining the PV requirements of any application is a three step process. First, the static loading per unit area (P) that the bearing must withstand in operation must be determined. For journal bearing configurations, the calculation is as follows:

$$P = W/(d \times b)$$

P = pressure, psi (kg/cm$^2$)
W = static load, lb (kg)
d = bearing surface ID, in. (cm)
b = bearing length, in. (cm)

Pressure (P) should not exceed certain maximum values at room temperature. These can be derived from a table of allowable static bearing pressure for most known materials. Next, the velocity (V) of the bearing relative to the mating surface must be calculated. For a journal bearing experiencing continuous rotation, as opposed to oscillatory motion, velocity is calculated as follows:

$$V = (dN)$$

where:
V = surface velocity, in/min (cm/min)
N = speed of rotation, rpm of cycles/min
d = bearing surface ID, in. (cm)

Finally, calculate PV as follows:

$$PV\ (psi\text{-}ft/min) = P\ (psi) \times V\ (in/min)\ 12$$

or, in metric units:

$$PV\ (kg/cm^2 - m/sec) = P\ (kg/cm^2) \times V\ (cm/min)/6000$$

The PV limits of unlubricated bearing materials are generally available from the manufacturer of the material or from technical literature. Since PV limits for any material vary with different combinations of pressure and velocity as well as with other test conditions, it is prudent to consult the manufacturer for detailed information.

One material which is particularly well suited to bearing applications is the polyimide thermoset material sold by Dupont under the trademark VESPEL ™. Properly lubricated VESPEL ™ parts can withstand approximately 1 million psi-ft/min.

SUMMARY OF THE INVENTION

The present invention obviates the problems experienced with prior designs by providing a constant velocity coupling similar to the S-plan joint but including a much less expensive bearing assembly. In this way, the need for an inexpensive, easily assembled substitute for the S-plan joint is satisfied. The coupling of the present invention is particularly useful as an inboard plunging coupling in a front wheel drive vehicle. However, the coupling is also useful in any environment requiring a high torque plunging coupling.

The present invention achieves these advantageous results by replacing the square needle bearing assembly of the S-plan joint with a bearing assembly that acts like a cam follower with multiple bearing surfaces. Preferably, the bearing assembly is constructed such that torque load is transmitted through three surfaces instead of one. By virtue of this construction, the net bearing surface area is increased by about 10 times. This dramatically increases the torque carrying capacity of the assembly.

The coupling of the present invention includes a drive can, a trunnion with a number of legs, and a bearing assembly mounted on each trunnion leg to allow the trunnion to plunge within the drive can and pivot in any direction up to 25°, as required. The drive can has a plurality of axial grooves formed therein. Each such groove has a predetermined shape which preferably includes axially extending planar surfaces against which the bearing assemblies roll. The number of legs on the trunnion is equal to the number of axial grooves. Each leg has a spherical surface portion. The bearing assembly is mounted on the spherical surface portion of each leg of the trunnion to support the trunnion for rolling and plunging motion in the axial grooves.

The bearing assembly includes a static or non-rotatable member and a cylindrical rolling member. The non-rotatable member has an outer peripheral shape or locking shoulder which is non-cylindrical and/or substantially complimentary to the cross-sectional shape of the axial grooves so that each non-rotatable member can slide within the groove but is locked against rotation within the grooves. The non-rotatable member further includes a plurality of radially spaced coaxial extensions, the radially innermost of the extensions has a spherical inner surface which is substantially complimentary to the spherical surface of the trunnion leg such that the trunnion leg is supported for pivoting motion in any direction about the geometric center of the spherical surface. The other surfaces of the coaxial extensions are preferably cylindrical.

The cylindrical rolling member has an axially extending cylindrical outer surface in rolling contact with the planar surface of the axial grooves. The cylindrical outer surface extends radially beyond at least a portion of the outer peripheral surface or locking shoulder of the non-rotatable member. Thus, in the assembled state, when the cylindrical surface contacts the planar surface of the axial groove, the locking shoulder or outer periphery of the non-rotatable member is slightly spaced from the planar surface of the axial groove so that it does not inhibit rolling of the cylindrical member along the planar surface of the axial groove. The cylindrical rolling member further includes a radially inner axially extending cylindrical portion which is radially spaced from the outer cylindrical portion.

In the assembled state, the inner cylindrical extension or portion of the rolling member extends between the spaced extensions of the non-rotatable member to provide two distinct sets of overlapping cylindrical surfaces. A bearing supports each set of overlapping surfaces for rotation. The outer cylindrical portion of the rolling member surrounds the outer cylindrical portion of the non-rotatable member so as to define a third set of overlapping cylindrical surfaces.

Thus, the rolling and non-rotatable members together define an interlocking construction in which the cylindrical portions of the rolling member are separated from one another by the cylindrical portions of the non-rotatable portion and vice versa. Three sliding surface interfaces are provided within the interlocking structure. The first sliding surface interface is between the inner extension of the non-rotatable member and the inner cylindrical portion of the rolling member. The second sliding surface interface is between the outer extension of the non-rotatable member and the inner cylindrical portion of the rolling member. The third sliding surface interface is between the outer extension of the non-rotatable member and the outer cylindrical portion of the rolling member.

A bearing is preferably located at each sliding surface interface to ensure smooth sliding between the relatively moving surfaces. While it is possible to use rolling element bearings, this would increase the complexity and cost of the assembly. It is therefore preferable to use sleeve bearings with low coefficient of sliding friction formed of a material having a high PV, such as VESPEL TM.

To facilitate the plunging motion of the rolling member within the axial groove, the planar surfaces of the axial grooves of the drive canister 10 are preferably provided with a surface layer having a low coefficient of sliding friction. This can be done in a number of ways. For example, the grooves may be spray coated with a material having a low coefficient of sliding friction. Alternatively, the grooves may be formed with an insert or sleeve of plastic or any high PV material such as VESPEL TM.

Another advantage of the coupling of the present invention is that the construction is more easily sealed because there are fewer moving parts. This makes it possible to eliminate the cumbersome rubber boot of conventional constant velocity coupling assemblies, if desired.

The coupling allows the trunnion to pivot up to 25° in any direction and plunge as required for couplings used as the inboard joint in front wheel drive vehicles. If desired, the bearing assembly can have an outer surface shaped complimentary to the shape of the rectangular groove of conventional S-plan joints to facilitate retrofit into existing S-plan type couplings and to ensure proper orientation of the bearing assemblies.

DETAILED DESCRIPTION OF THE INVENTION

Figure 1:
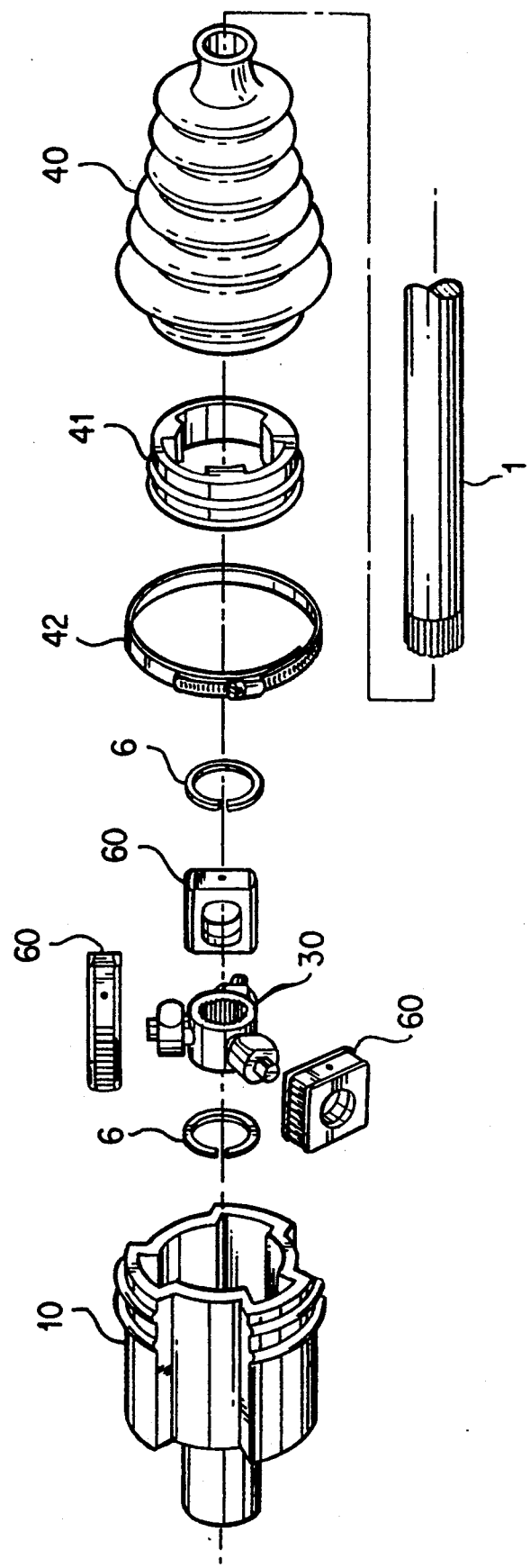
FIG. 1 is an exploded perspective view of a known S-type joint coupling.
Figure 2:
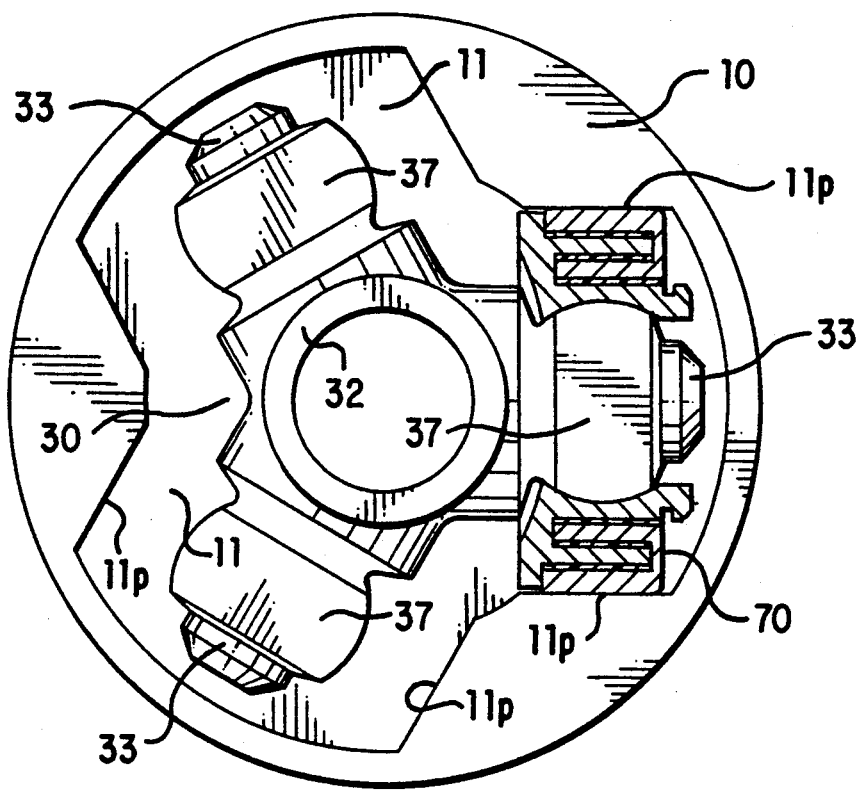
FIG. 2 is an end view illustrating, somewhat schematically, the constant velocity coupling of the present invention.

As shown in FIG. 2, the coupling of the present invention is, in principle, similar to that shown in the conventional assembly of FIG. 1. Like the conventional assembly, the coupling of the present invention includes a drive canister 10, a trunnion 30 having a splined shaft receiving opening and three legs, and bearing assemblies 70 mounted on each of the trunnion legs to support the trunnion 30 in axial grooves 11 formed in the drive canister 10. As discussed above, the trunnion must be supported for a limited angular movement (about 25°) about transverse axes and plunging or axial movement relative to the drive canister 10. In this case, the trunnion is pivotable at least 25° in any direction and can plunge along the axial grooves.

As with the conventional assembly, the coupling of the present invention may further include a flexible boot assembly and other conventional components required by the intended use. However, it is possible to use a less cumbersome seal arrangement such as a built-in seal between the sliding surfaces because of the simple construction of the bearing assembly 70.

The principal difference between the coupling of the present invention and the conventional coupling shown in FIG. 1 resides in the construction of the bearing assembly 70. Additionally, the drive canister housing 10 is slightly different because of the requirements of the bearing assembly 70.

The configuration of the drive canister or housing 10 can best be appreciated with reference to FIG. 2. As shown therein, a plurality of axial grooves 11 are formed in the drive canister 10. These grooves include planar surfaces 11p. The planar surfaces 11p preferably have a coating of material with a low coefficient of sliding friction such as a low friction spray or a lining of plastic or any high PV material such as VESPEL TM. The thickness of the coating shown in FIG. 2 is greatly exaggerated.

The trunnion 30 includes a centrally formed opening having a shaft receiving spline 32 formed therein. The legs 33 of the trunnion extend radially from the center of the trunnion as shown and are each provided with a spherical surface portion 37.

The bearing assembly 70 generally includes an inner portion in spherical contact with the spherical surface portion 37 of the trunnion 30 and an outer surface adapted to roll along the planar surfaces 11p of the axial grooves 11 formed in the drive canister or housing 10. The bearing assembly 70 further includes a locking shoulder having a non-cylindrical shape which is substantially complimentary to the shape of at least opposed edges of the axial grooves 11 so as to properly orient the bearing assembly 70 in the grooves. The shape of the locking shoulder is best shown in FIG. 4A, discussed below.

Figure 3:
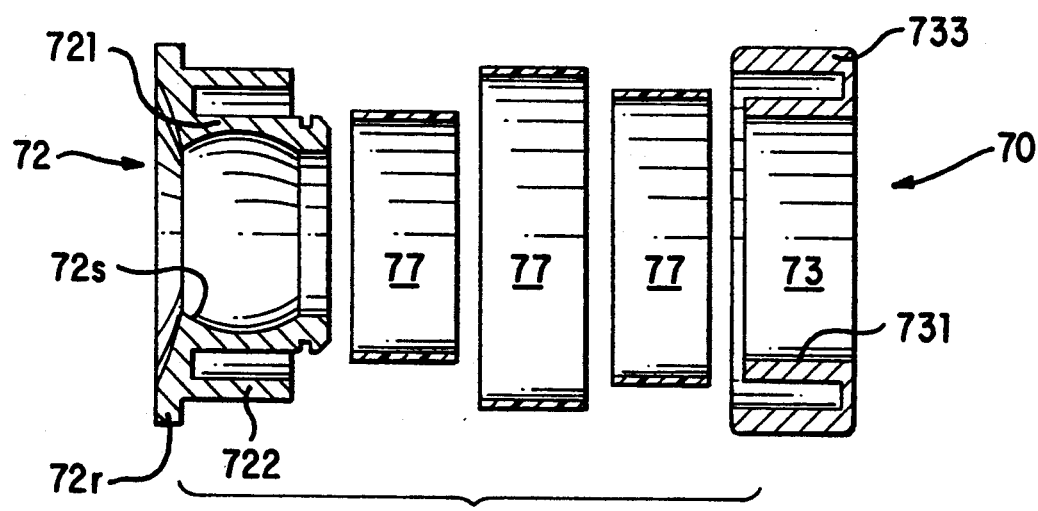
FIG. 3 is an exploded axial section view of the bearing assembly of the coupling of the present invention.
Figure 4:
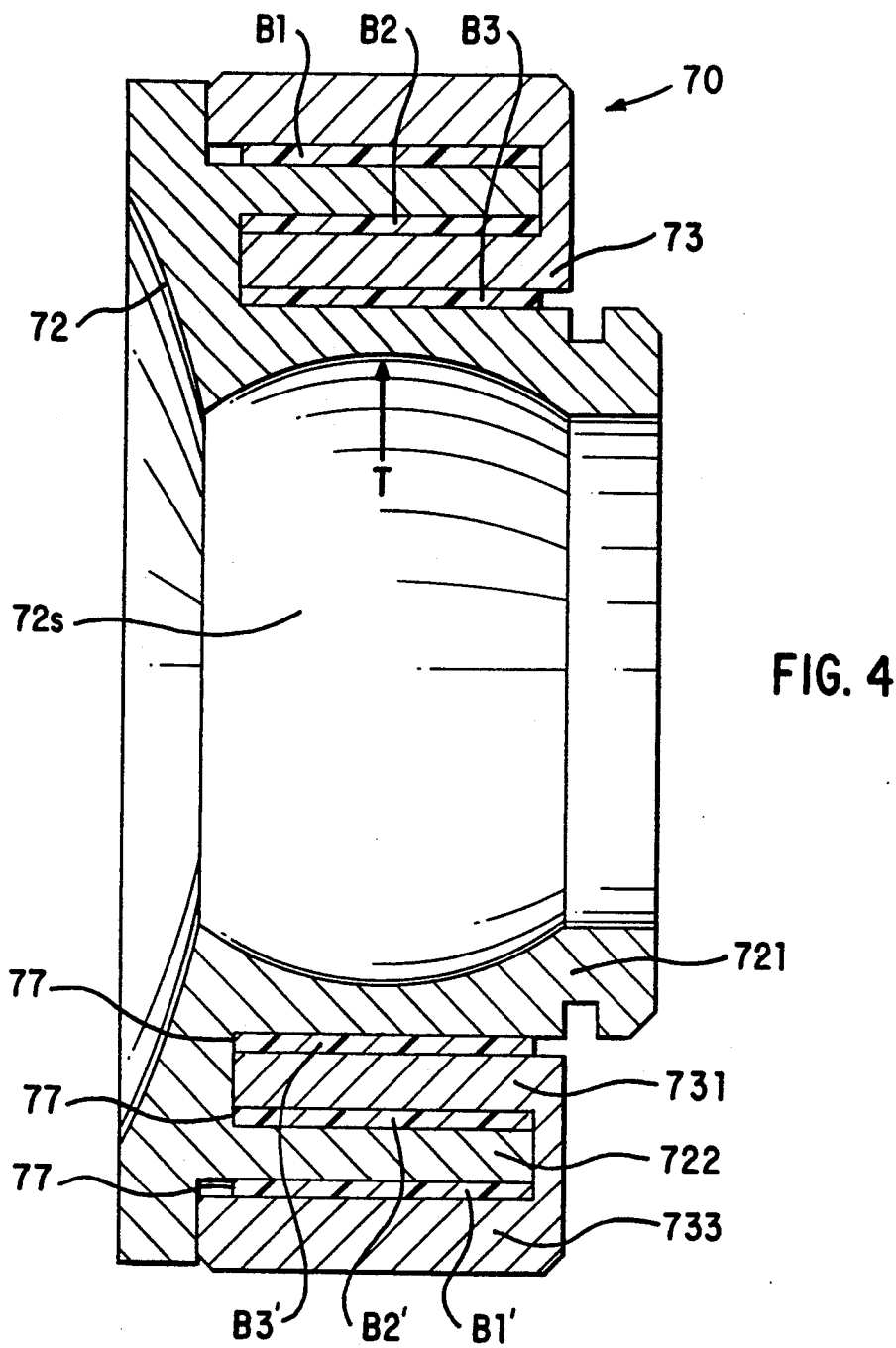
FIG. 4 is an assembled axial section view of the bearing assembly of the present invention.
Figure 4A:
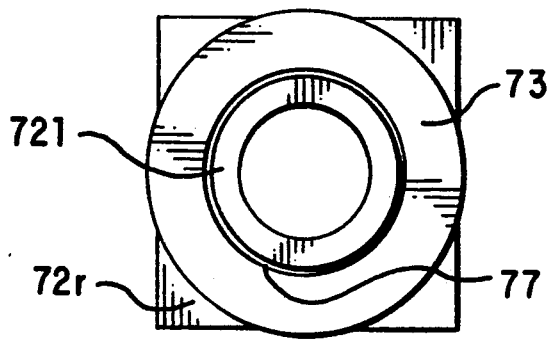
FIG. 4A is a plan view of the bearing assembly of FIG. 4.

The details of the construction of the bearing assembly 70 can best be appreciated with reference to FIGS. 3, 4 and 4A. As shown in these figures, the bearing assembly 70 includes a non-rotatable or static member 72. The non-rotatable member has a spherical inner surface 72s; a rectangular outer portion or locking shoulder 72r best shown in FIG. 4A; and at least two radially spaced axially extending extensions, including an inner extension 721 on which the cylindrical surface 72s is formed and an outer cylindrical extension 722 coaxial with inner extension.

Figure 1A:
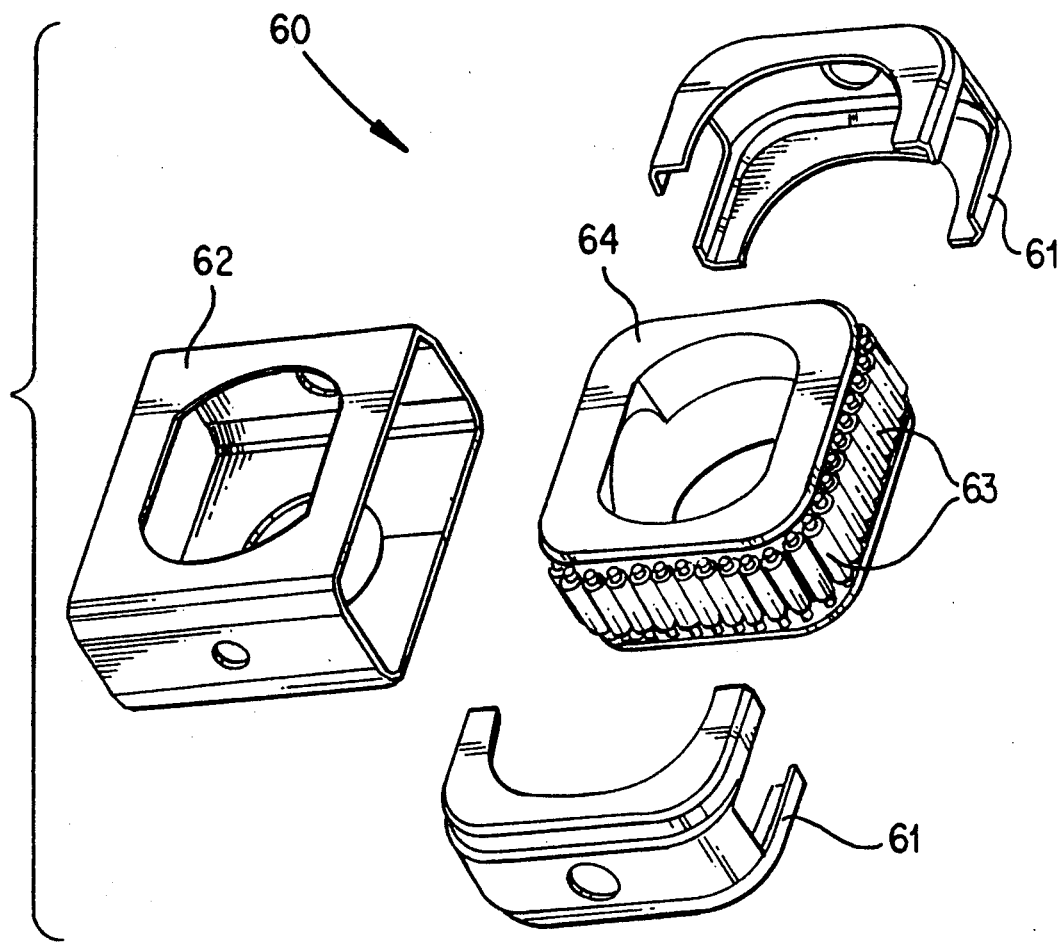
FIG. 1A is an exploded perspective view of the bearing assembly used in the S-type joint coupling of FIG. 1.

To facilitate assembly, the static or non-rotatable member 72 is cut away in a conventional manner such as illustrated in FIG. 1A, for example, so that the bearing assembly can be tilted and rotated onto the spherical portion. Once the so assembled structure is fitted into the axial grooves of the drive canister 10, the locking shoulder 72r prevents the bearing assembly from tilting to the degree needed to allow the spherical portion to slip out of the bearing assembly. Thus, the shoulder 72r and groove 11 cooperate to align the bearing assembly 70 and to retain the trunnion leg within the assembly.

The bearing assembly 70 also includes a rolling member 73 having two radially spaced coaxial cylindrical extensions 731 and 733. In the assembled state shown in FIG. 4, the cylindrical extensions 731, 733 of the rolling member interlock with the extensions 721, 722 of the non-rotatable member so as to define three radially spaced cylindrical bearing surfaces B1, B2, B3 on one side and B1', B2' and B3' on the other side.

The bearing further comprises three cylindrical bearing sleeves 77 which are preferably formed of a high PV material with a low coefficient of sliding friction such as VESPEL TM. A bearing sleeve 77 is provided at each bearing surface B1, B2 and B3. In the assembled state, the sleeves 77 are in contact with a cylindrical surface of the rolling member and a cylindrical surface of the non-rotatable member. The sleeves are each secured to one of the two surfaces which they contact, such that each bearing surface is defined by the bearing sleeve sliding relative to either the rolling member or non-rotatable member. Preferably, the bearing sleeve 77 is secured on its inner surface to the outer surface of an extension so that the outer surface of the bearing sleeve acts as the bearing surface. Since the outer surface of the bearing sleeve 77 has a slightly larger surface area, this adds to the total bearing surface area.

By virtue of this construction, torque transmitted through the bearing assembly 70 is transmitted through and distributed among the three radially spaced bearing surfaces B1, B2, and B3. For example, with reference to FIG. 4, if a torque force T is applied against the spherical surface 72s of the static portion 72, the force is reacted by and distributed amongst the bearing surfaces labeled B3, B1 and B2'. A force acting in the opposite direction is reacted by and distributed among the bearing surfaces labeled B3', B' and B2. This results in a significant increase in the total bearing area. In particular, it is estimated that the total bearing surface area is increased 10 times over a conventional tripod design. This in turn improves the torque capacity of the coupling so that the coupling is able to transfer the high torque of larger engines. Yet, the coupling of the present invention is much less expensive than an S-plan joint since the bearing assembly used is relatively simple, requiring only five parts which can be easily manufactured and assembled.

In operation, the support of the trunnion legs on the spherical seats permits the necessary angular motion in any direction. The trunnion can also freely plunge axially relative to the drive canister 10 because the rolling member 73 rolls along the non-friction coated planar surfaces of the axial grooves. The trunnion 30 is retained in the bearing assemblies because the locking shoulder 72r, best shown in FIG. 4A, limits relative movement between the bearing assemblies and the trunnion legs.

I claim:

1. A coupling, the coupling comprising a drive canister having a longitudinal axis and a plurality of axial grooves formed therein, each groove having a predetermined shape and extending axially in the direction of the longitudinal axis of the drive canister; a trunnion having a centrally formed splined opening and a plurality of legs equal in number to the number of axial grooves formed in the drive canister, each leg having a longitudinal axis which extends radially from the opening, and a spherical surface portion; and a bearing assembly mounted on the spherical surface portion of each leg, each bearing assembly comprising:

a non-rotatable member which includes a spherical surface portion for supporting the spherical surface portion of a trunnion leg, the non-rotatable member further comprising a plurality of radially space axially extending sleeves which extend axially along the longitudinal axis of the trunnion leg; a rolling member having a plurality of radially spaced axially extending cylindrical surfaces supported on the sleeves of the non-rotatable member for rotation relative to the non-rotatable member the sleeves also extending axially along the longitudinal axis of the trunnion leg, the rolling member having a cylindrical outer surface in contact with one of the axial grooves of the drive canister; and a bearing supporting each cylindrical surface of the rolling member on a corresponding one of the sleeves of the non-rotatable member whereby torque loads are distributed among the bearings so that the torque load is distributed through an increased total bearing surface area.

2. The coupling of claim 1, wherein the trunnion has three legs.

3. The coupling of claim 1, wherein the bearing assembly includes at least three bearing surfaces.

4. The coupling of claim 1, wherein the bearings comprise a sleeve of a plastic material having a low coefficient of friction secured to one of the non-rotatable member and the rotatable member.

5. The coupling of claim 1, wherein each of the axial grooves includes a lining made of a plastic material having a low coefficient of friction.

6. The coupling of claim 1, wherein the non-rotatable member includes a rectangular outer peripheral portion having edges which are substantially complimentary to the faces of the axial grooves so as to allow the non-rotatable member to slide within the axial grooves, but preventing rotation of the non-rotatable member.

7. A coupling for use in a constant velocity drive shaft, the coupling comprising:

a drive canister, the drive canister having a plurality of guide grooves formed therein, each of the guide grooves having a predetermined cross-section and including a pair of planer surfaces;

a trunnion having a plurality of legs equal in number to the number of guide grooves formed in the drive canister the grooves extending in a predetermined direction, each of the legs of the trunnion having a spherical surface portion formed thereon, the spherical surface having a geometric center;

a bearing assembly mounted on the spherical portion of each of the trunnion legs for supporting the trunnion within the grooves in the canister for plunging movement in the direction of the grooves formed in the drive canister and for pivoting motion about the geometric center of each of the spherical portions formed on the trunnion legs, the bearing assemblies comprising:

a non-rotatable member having a non-cylindrical outer peripheral shape so as to define a locking shoulder which allows the non-rotatable member to slide within the guide grooves but locks the non-rotatable member against rotation within the grooves, the non-rotatable member further including a plurality of spaced extensions including an outermost extension and an innermost extension, the innermost extension having a spherical inner surface portion which is complimentary to the spherical surface portion of the trunnion leg such that the trunnion leg is supported for pivoting motion in any direction about the geometric center of the spherical surface portion of the trunnion leg;

a cylindrical rolling member which includes a plurality of spaced cylindrical extensions including an outermost extension and an innermost extension, the outermost extension having a cylindrical outer surface in rolling contact with the planar surface of the guide grooves, the cylindrical outer surface extending outward of at least a portion of the locking shoulder so that, in the assembled state, the cylindrical outer surface contacts the planar surfaces of the axial grooves and the locking shoulder is spaced from the guide grooves;

the rolling member and the non-rotatable member being interlocked such that the cylindrical extensions of the rolling member and the extensions of the non-rotatable member overlap one another, each extension being supported on, and for movement relative to, the extension which it overlaps by a bearing so as to allow rotation of the rolling member relative to the non-rotatable member.

8. The coupling of claim 7, wherein the bearings supporting the overlapping extensions are sleeve bearings formed of a material having a low coefficient of sliding friction.

9. The coupling of claim 8, wherein the sleeve bearings are formed of a plastic material having a high PV.

10. The coupling of claim 7, wherein the guide grooves are coated with a material having a low coefficient of sliding friction.

11. The coupling of claim 7, wherein linings of a plastic material having a low coefficient of sliding friction are provided on the planar surface of the guide groove.

12. The coupling of claim 7, wherein the non-rotatable member has a substantially rectangular outer peripheral shape having four faces, at least two of these faces being substantially complimentary to edges of the guide grooves so as to lock the non-rotatable member against rotation.

13. A coupling for connecting two shafts, the coupling comprising:

a drive canister having a longitudinal axis and first and second ends, a shaft attachment means formed on the first end, and a plurality of guide grooves extending toward the first end from the second end of the drive canister;

a trunnion having a shaft receiving means formed therein, the trunnion including a plurality of legs equal in number to the number of guide grooves formed in the drive canister, each of the legs having a spherical surface portion formed thereon, the spherical surface portion having a geometric center; and a bearing assembly for supporting each of the spherical portions of the legs in the guide grooves of the drive canister for plunging motion along the guide grooves and pivoting motion about the geometric center of the spherical portions such that the trunnion can pivot about transverse axes and move axially relative to the canister, each bearing assembly comprising:

a non-rotatable member having a spherical inner surface for supporting the spherical portion of the trunnion leg and an outer peripheral surface having a shape which allows the non-rotatable member to slide within the guide grooves but prevents substantial rotation of the non-rotatable member within the guide grooves;

a rolling member rotatably mounted on the non-rotatable portion, the rolling member having a cylindrical outer surface adapted to roll within the guide grooves, the cylindrical outer surface extending outward of at least a portion of the outer surface of the non-rotatable member so as to contact the surface of the guide grooves and space the non-rotatable member from the surface of the guide grooves;

wherein the non-rotatable member includes a plurality of coaxial spaced extensions and the rolling member includes a plurality of coaxial spaced extensions and wherein the extensions of the non-rotatable member interlock with the extensions of the rotatable member such that the extensions overlap one another so as to provide a series of spaced bearing surfaces and wherein a bearing is located at each such bearing surface to support the rolling member for rotation relative to the non-rotatable member.

14. The coupling of claim 13, wherein the bearings are sleeves formed of a plastic material having a high PV.

15. The coupling of claim 13, further comprising a lining formed of a plastic material having a low coefficient of friction.

16. The coupling of claim 13, wherein the non-rotatable member has a rectangular outer peripheral shape which includes two faces which are substantially complimentary to respective faces of the guide grooves so as to lock the non-rotatable member against rotation within the guide groove.

17. The coupling of claim 13, wherein the trunnion includes three circumferentially spaced legs and wherein the trunnion legs and spherical surface portions are formed of one piece.

18. A coupling for connecting first and second transmission shafts, said coupling comprising: a drive canister connected to one of the transmission shafts and having a plurality of angularly spaced, axially extending transmission grooves in its inner peripheral surface, an inner trunnion member connected to the other of the transmission shafts and projecting into the drive canister, a plurality of trunnion legs radially extending on said inner trunnion member to project into corresponding ones of the transmission grooves, a spherical portion provided on each of the trunnion legs, a non-rotatable member supported on the spherical portion for universal movement thereon, a rotatable member rotatably fitted on said non-rotatable member and rollably engaged in a corresponding transmission groove, the non-rotatable member including a plurality of extensions and the rotatable member including a plurality of extensions, wherein the extensions of the non-rotatable member interlock with the extensions of the rotatable member such that the extensions overlap one another so as to provide a series of spaced bearing surfaces and wherein a bearing is located at each such bearing surface to support the rolling member for rotation relative to the non-rotatable member.

19. The coupling of claim 18, wherein the bearings are sleeves formed of a plastic material having a high PV limit.

* * * * *